United States Patent [19]

Zwart et al.

[11] Patent Number: 5,064,627
[45] Date of Patent: Nov. 12, 1991

[54] CONTINUOUS PROCESS FOR SEPARATING HYDROGEN IN HIGH PURITY FROM A GASEOUS HYDROGEN-CONTAINING MIXTURE

[75] Inventors: Rudolf L. Zwart; Johan T. Tinge, both of Sittard, Netherlands

[73] Assignee: Stamicarbon B.V., Geleen, Netherlands

[21] Appl. No.: 395,794

[22] Filed: Aug. 18, 1989

[30] Foreign Application Priority Data

Aug. 22, 1988 [EP] European Pat. Off. ........ 88201784.1

[51] Int. Cl.$^5$ .......................... C01B 3/00; C01B 3/04
[52] U.S. Cl. .................................... 423/248; 423/658.2
[58] Field of Search ................... 423/248, 648.1, 658.2

[56] References Cited
U.S. PATENT DOCUMENTS 4,704,267 11/1987 Dimartino .......................... 423/351

OTHER PUBLICATIONS

European Patent Application 0094136, published 11-16-83.

Primary Examiner—Wayne A. Langel
Attorney, Agent, or Firm—Cushman, Darby & Cushman

[57] ABSTRACT

A continuous process for separating hydrogen in high purity from a gaseous hydrogen-containing mixture by absorbing in an absorber unit the hydrogen by metal hydride forming particles suspended in an inert liqid and desorbing in a desorber unit the hydrogen from the hydrided particles includes the step of treating the suspension of the hydrided particles before entering the desorber unit to remove dissolved gaseous non-hydrogen components by stripping with hydrogen, preferably with a part of desorbed hydrogen. By this way it is possible to obtain hydrogen having a purity of more than 99.9%.

6 Claims, 3 Drawing Sheets

CONTINUOUS PROCESS FOR SEPARATING HYDROGEN IN HIGH PURITY FROM A GASEOUS HYDROGEN-CONTAINING MIXTURE

The present invention relates to a process for separating hydrogen in high purity from a gaseous hydrogen-containing mixture by absorbing in an absorber unit the hydrogen by metal hydride former particles suspended in an inert liquid and desorbing in a desorber unit the hydrogen from the hydrided particles.

A process of this kind is known from EP-A 0094 136. When this process is carried out in the absorber unit non-hydrogen components of the used gaseous hydrogen-containing mixture like nitrogen, methane etc. are dissolved in the inert suspending liquid and are stripped off this liquid by hydrogen liberated in the desorber unit with the result that the purity of the recovered hydrogen is not higher than 97%.

Therefore, the object of the present invention is the provision of a process for improving the purity of hydrogen produced by an absorption/desorption process of the above described kind.

According to the present invention there is provided a continuous process for separating hydrogen in high purity from a gaseous hydrogen-containing mixture by absorbing in an absorber unit the hydrogen by metal hydride forming particles suspended in an inert liquid and desorbing in a desorber unit the hydrogen from the hydrided particles which is characterized by the fact that the suspension of the hydrided particles before entering the desorber unit is treated to remove dissolved gaseous non-hydrogen components by stripping with hydrogen, preferably with a part of desorbed hydrogen.

Surprisingly it has been found that by this process it is possible to remove almost quantitatively non-hydrogen contaminants dissolved in the inert liquid in which the hydride former particles are suspended, and to obtain hydrogen in high purity.

As far as the metal hydride former particles and the inert liquids for suspending the same usable according to the present invention are concerned all known materials may be used and reference may be made to the already mentioned EP-A 0094 136 and to the EP-A (patent application which has been filed by the same applicants at the same date with the European Patent Office under the internal file number V 6078).

Preferably the volume percentage of the metal hydride former particles in the inert liquid is between 1 and 25 and more preferably between 5 and 20.

All gaseous hydrogen-containing mixtures containing hydrogen in different amounts which may be used as starting materials for carrying out the process of the present invention, for example ammonia synthesis gas comprising approximately 75% hydrogen and 25% nitrogen, however, also different gaseous hydrogen-containing mixtures preferably comprising hydrogen as component can be used.

Preferably the hydrogen used for stripping the suspension of the hydrided particles is a part of hydrogen desorbed from these hydrided particles, however, pure hydrogen coming from any source can be used.

If desorbed hydrogen is used the process of the present invention preferably can be carried out according to one of the following three embodiments.

According to one embodiment the process of the present invention is performed out by carrying out the stripping treatment in a flash unit located upstream to the desorber unit.

According to a second more preferred embodiment the stripping treatment is carried out in absorber unit by a part of the hydrogen liberated in the desorber unit.

According to a third and most preferred embodiment the stripping treatment is carried out in a stripping unit located between the absorber unit and the desorber unit, the absorber unit being operated under a pressure which is higher than the pressure in the stripping and desorber units.

It is also preferable to activate the hydrid forming particles in the used suspension before they are used in the absorber unit. Preferably this activation is carried out as described in the already mentioned EP-A (patent application which has been filed the same applicants at the same date with the European Patent Office under the internal file number V 6078), i. e. by heating in a reactor a suspension of dried metal hydride former particles in a degassed inert liquid to elevated temperatures, evacuating the reactor, introducing hydrogen into the reactor until a pressure above the hydrogen partial pressure has been achieved, slowly releasing the pressure and evacuating the reactor at elevated temperatures.

The process of the present application in the following is explained in more detail by reference to the attached drawings.

Figure 1:
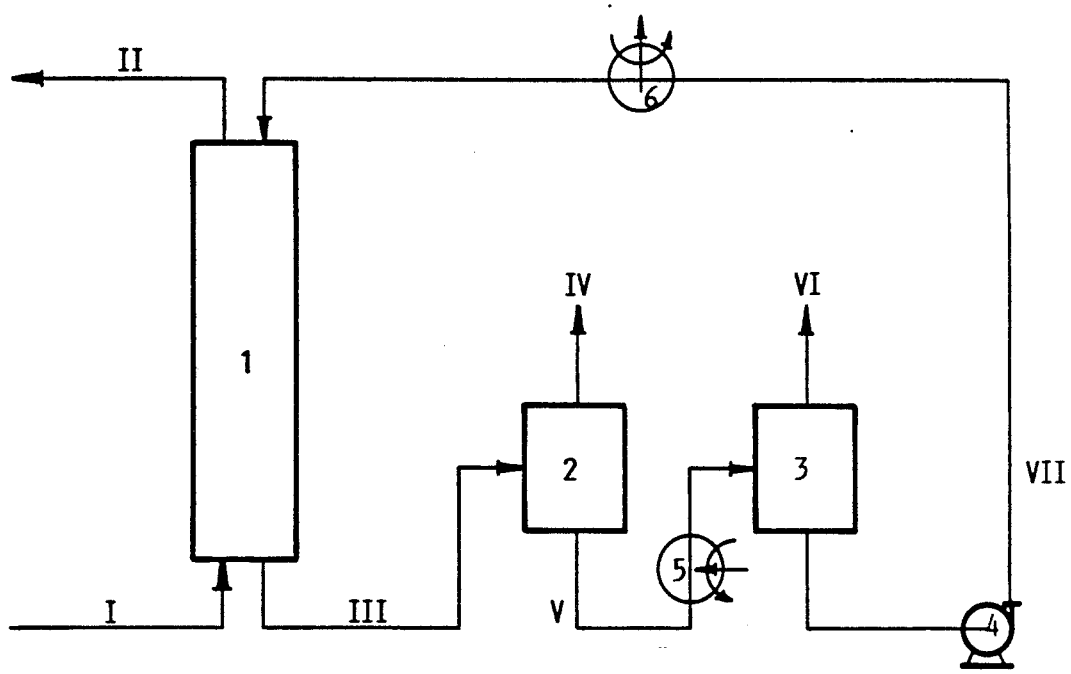
FIG. 1 is a flow sheet showing the above mentioned first embodiment of carrying out the process of the present invention.

Referring to the first embodiment of the present invention as illustrated by FIG. 1 a gaseous hydrogen-containing mixture I, preferably ammonia synthesis gas, is introduced into the absorber unit 1 in which the major part of the hydrogen is absorbed by metal hydride former particles suspended in an inert liquid, for example $LaNi_{4.7}Al_{0.3}$ particles suspended in an inert liquid, like a silicone oil, for example PD 5 - oil (silicon oil of Bayer). Hydrogen-poor effluent gas II which in the case of synthesis gas consists mainly of nitrogen and minor amounts of noble gases like argon is discharged from the upper end of the absorber unit 1 whereas a suspension of metal hydride former particles in an inert liquid is introduced into the upper part of the absorber unit 1 to contact the gaseous hydrogen containing mixture countercurrently for the absorption of hydrogen mainly by exothermic metal hydride formation. From the lower part of the absorber unit 1 a suspension III of hydrogen-loaded particles, mainly metal hydrides, is discharged. Dissolved in the inert liquid of this suspension are non-hydrogen contaminants in an amount of approximately 1 to 9 mole % based on the totale amount of absorbed gas like nitrogen, noble gases, for example argon which lateron in the desorber unit together with the hydrogen from the metal hydride forming particles would be released and contaminate the liberated hydrogen.

Therefore, according to the first embodiment of the present invention the suspension III is introduced into a flash unit 2 wherein by a sudden pressure release a part of the hydrogen absorbed by the metal hydride former particles is released and is stripping a considerable part of the dissolved contaminants off the inert liquid. This released hydrogen IV together with contaminants stripped off the inert liquid is discharged from the upper part of the flash unit 2 and may be discarded. The flash unit 2 may consist of one or more vessels connected in series according to the kind and amount of the contaminants in the inert liquid, and to the desired degree of purification. Approximately 75% to 99.5% of the contaminants in the inert liquid may be removed in the flash unit 2. The pressure of the suspension III coming from the absorber unit 1 is approximately 10 to 300 bar, preferably 15 to 150 bar, and is released to approximately 10 to 100 bar, preferably 10 to 50 bar to effect a partial liberation of hydrogen.

The suspension V is passed from the flash unit 2 to a heating means 5 wherein it is heated to a temperature of approximately 20° to 150° C., preferably 40° to 100° C., before being introduced into the desorber unit 3 being operated under a pressure which can be lower than the pressure in flash unit 2, for example under pressure of 5 to 200 bar, preferably 5 to 100 bar.

In this desorber unit the major part of the absorbed hydrogen is released, and the discharged hydrogen VI consists of essentially pure hydrogen (purity of more than 99%).

From the desorber 3 the suspension VII of desorbed metal hydride forming particles in an inert liquid by a pumping means 4 is transported to a cooling means 6 with which the temperature of the suspension is reduced to approximately 0° to 100° C., preferably 20° to 70° C. before it is reintroduced into the upper part of the absorber 1 to absorb countercurrently the hydrogen from the introduced hydrogen containing gaseous mixture I.

If necessary, the suspension VII may replenished by a fresh suspension of metal hydride forming particles in an inert liquid. Additionally, the suspension VII and/or a replenishing suspension may be activated according to the process as described in EP-A (patent application which has been filed at the European Patent Office at the same date under the internal file number V 6078).

The second and third preferred embodiments of the present invention are carried out in a different manner then the above outlined first embodiment insofar as the loaded suspension is stripped countercurrently to remove dissolved gaseous non-hydrogen components by hydrogen which can be a part of the hydrogen liberated in the desorber unit.

Figure 2:
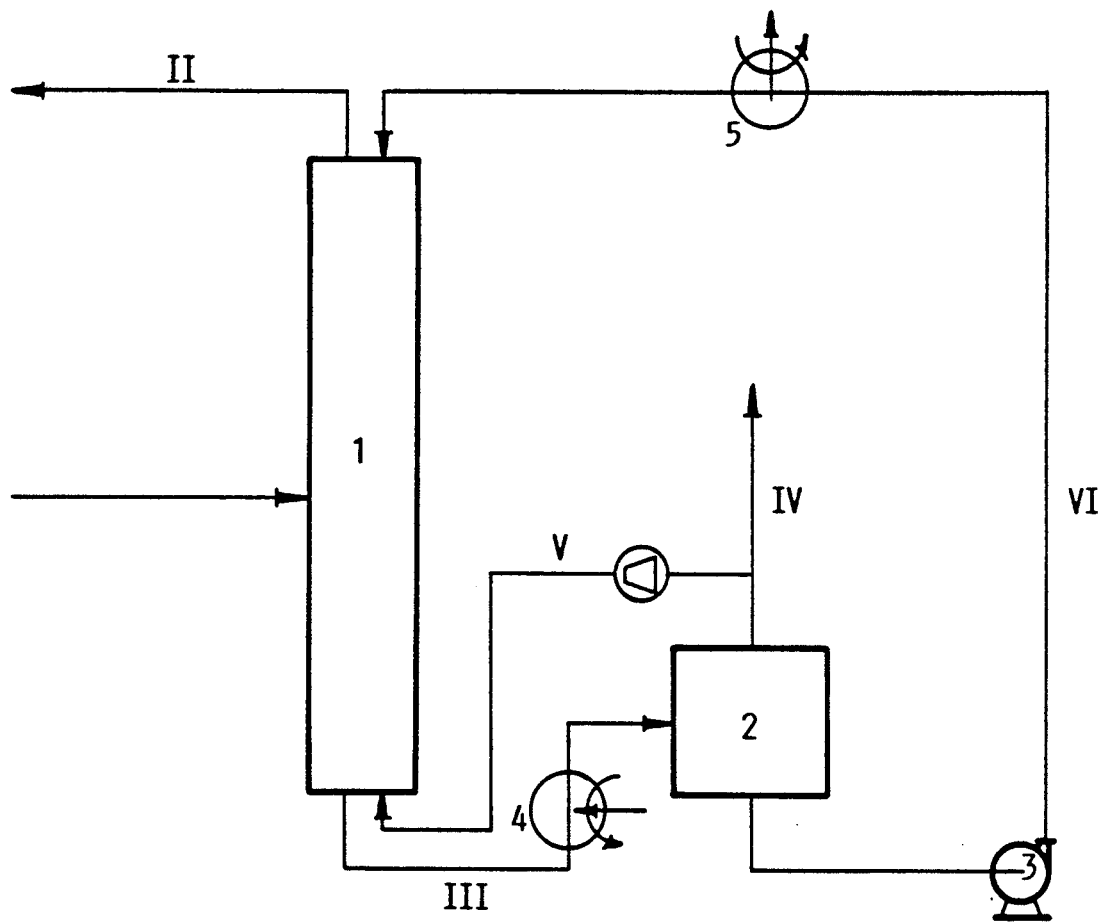
FIG. 2 is a flow sheet showing the second above mentioned embodiment.

According to the embodiment shown in FIG. 2 the gaseous hydrogen-containing mixture I is introduced into the absorber unit approximately into the middle part thereof and hydrogen-poor off-gas II is discharged from the upper part of the absorber unit whereas from the bottom part of this unit a suspension III of hydrogen-loaded metal hydride former particles is passed through a heating means in which it is heated to a temperature of 25° to 200° C., preferably 40° to 150° C., and introduced into the desorber unit 2 in which the hydrogen desorption takes place.

From the hydrogen off-gas stream IV a stream V is branched off and introduced into the bottom part of the absorber unit I to strip off gaseous non-hydrogen contaminants, like nitrogen, methane etc., from the inert liquid in which the metal hydride former particles are suspended. The stripping off-gas may be combined with the hydrogen-poor gas II being discharged from the upper part of the absorber unit I.

The suspension VI of desorbed metal hydride former particles in an inert liquid leaving the desorber unit on its bottom part is pumped by a pumping means 3 through a cooling means 5 to a temperature of 0° C. to 100° C., preferably 20° C. to 70° C., before being introduced into the upper part of the absorber unit I.

The pressure in the absorber unit preferably is between 10 and 300 bar, especially between 15 and 150 bar, and the temperature of the suspension III leaving this absorber unit preferably has a temperature of 5° to 150° C., especially 30° to 125° C. The pressure in the desorber unit can be the same as in the absorber unit, and the suspension VI leaving the desorber unit preferably has a temperature of 20° to 190° C., especially 30° to 100° C.

It is preferred to use 2 to 20% of the hydrogen liberated in the desorber unit for stripping off the gaseous non-hydrogen components in the absorber unit 1.

By this embodiment of the present invention it is possible to obtain a hydrogen gas stream IV having a purity of more than 99.9%.

Also in this case a replenishment and activation of the suspension VI as described in connection with the embodiment of FIG. 1 can be carried out.

Figure 3:
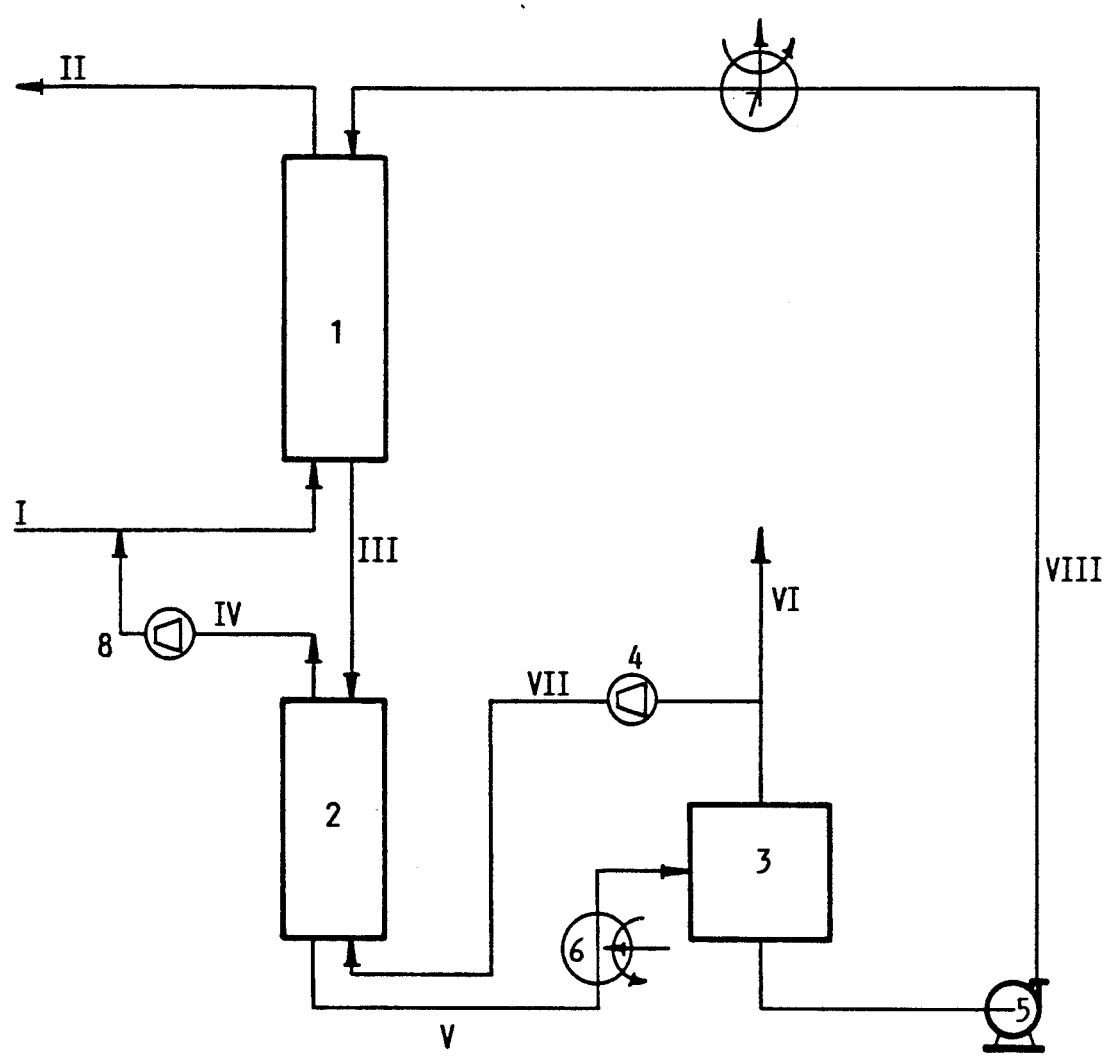
FIG. 3 is a flow sheet showing the third and most preferred embodiment of the process of the present invention.

FIG. 3 is illustrating an embodiment of the present invention according to which the stripping not is carried out in the absorber unit as in the case of the embodiment of FIG. 2 but in a separate stripping column.

A gaseous hydrogen-containing mixture I is introduced into the absorber unit 1 and a hydrogen poor off-gas II is leaving the upper part of this absorber unit. A suspension III of hydrogen-loaded metal hydride former particles in an inert liquid contaminated with gaseous non-hydrogen components is leaving the bottom part of the absorber unit 1 and entering the upper part of a stripping column 2 wherein the gaseous non-hydrogen components, like nitrogen, methane etc., are stripped off by a pure hydrogen gas stream VII being derived from the main hydrogen stream VI generated in the desorber unit 3 into which the suspension V leaving the bottom part of the stripping column 2 is introduced after having been heated.

The suspension VIII of desorbed metal hydride former particles in an inert liquid leaving the bottom part of the desorber unit 3 by a pumping means 5 is pumped through a cooling means 7 before it enters the upper part of the absorber unit 1 to be contacted countercurrently with the gaseous hydrogen-containing mixture.

According to this embodiment the absorber unit is operated under a higher pressure than the stripping column and the desorber unit, the latter one preferably being operated under a pressure still lower than the pressure of the stripping column. Therefore, the pressure of the hydrogen stream VII branched from the hydrogen main stream VI by a compressor means 4 is increased before it enters the stripping column 2 whereas the stripping column off-gas IV before entering the absorber unit after having been combined with the gaseous hydrogen-containing mixture I by a compressor means 8 preferably is brought to the pressure of the gaseous mixture I.

It is preferred to use a pressure in the absorber unit 1 of 10 to 300 bar, preferably 15 to 150 bar, whereas the pressure in the stripping column preferably is the same or less, preferably between 10 and 100 bar.

The suspension III leaving the absorber unit preferably has a temperature of 5° to 150° C. and especially 30° to 125° C., and the temperature of the suspension V leaving the stripping unit 2 preferably is 5° to 150° C. and especially 30° to 125° C. By the heating means 6 preferably it is brought to a temperature of 25° to 200° C. and especially 40° to 150° C. whereas the temperature of the suspension VIII leaving the desorber unit preferably has a temperature of 20° to 190° C., especially 30° to 100° C., and the temperature by the cooling means 7 is decreased preferably to a temperature being in the range of 0° to 100° C., especially 20° to 70° C.

The absorber, desorber, flashing and stripping units may consist of more than one vessel and column, respectively. As absorber and desorber units for example the absorbers and desorbers described in the EP-A 0094 136 can be used. However, it is possible to use any conventional absorber and desorber units. Both the absorbers and the desorbers according to the embodiments of the FIG. 1 to 3 preferably are construed in such a manner that an axial mixing of the suspension and of the gaseous phase is suppressed.

The present invention will be described in further detail by way of the following non-limiting examples.

EXAMPLE I

This examples refers to the flow sheet given in FIG. 1. The used gaseous hydrogen-containing mixture I derived from an ammonia plant contains 74.3 mole % hydrogen, the pressure being 65 bar. $MNi_{4.5}Al_{0.5}$ (M=Mischmetall) particles (20 vol.-%) suspended in PD5 silicon oil (Bayer) acts as absorbing suspension. The hydrogen recovery of this process is 95%. The temperature of the suspension introduced into the top part of the absorber is 40° C. The temperature of the suspension discharged from the bottom part of the absorber is 93° C. In flash unit 2 approximately 22% of the absorbed hydrogen is liberated for the stripping treatment. The purity of the recovered hydrogen in the desorber 3 is 99.5%.

EXAMPLE II

This example refers to the flow sheet given in FIG. 3. Both the gas I acting as hydrogen source and the hydrid former particles containing suspension are the same as those used in Example I. The effluent gas II contains 23 mole % hydrogen. So the hydrogen recovery of this process is approximately 90%. The temperature of the suspension introduced into the top part of the absorber unit is 35° C. The temperature of the suspension discharged from the bottom part of the absorber is 85° C. 6% of the hydrogen liberated in the desorber unit is used for the stripping treatment. The purity of the recovered hydrogen in the desorber unit is 99.7%, the pressure being 20 bar. The temperature of the suspension discharged from the bottom part of this unit is 83°. Both the heating means 6 and the cooling means 7 are operated.

EXAMPLE III

This example refers to the flow sheet given in FIG. 3. The used gaseous hydrogen-containing mixture I is derived from a naphtha cracker. The hydrogen content is 92 mole % and the pressure being 65 bar. The hydrid former particles containing suspension is the same as the one described in Example I. The temperatures of the suspension introduced into the top part and discharged from the bottom part of adsorber 1 are 35° C. and 96° C., respectively. By using 3% of the hydrogen liberated in the desorber unit for the stripping treatment, the purity of the recovered hydrogen in the desorber 3 is 99.9%.

We claim:

1. A continuous process for separating hydrogen in high purity from a gaseous hydrogen-containing mixture by absorbing in an absorber unit the hydrogen by metal hydride forming particles suspended in an inert liquid and desorbing in a desorber unit the hydrogen from the hydrided particles, characterized in that the suspension of the hydrided particles before entering the desorber unit is treated to remove dissolved gaseous non-hydrogen components by stripping with hydrogen.

2. A process according to claim 1, characterized in that the hydrogen used for the stripping process is a part of desorbed hydrogen.

3. A process according to claim 1, characterized in that the stripping treatment is carried out in a flash unit located upstream to the desorber unit.

4. A process according to claim 1, characterized in that the stripping treatment is carried out in the absorber unit by a part of the hydrogen liberated in the desorber unit.

5. A process according to claim 1, characterized in that the stripping treatment is carried out in a stripping unit located between the absorber unit and the desorber unit, the absorber unit being operated under a pressure which is higher than the pressure in the stripping and absorber units.

6. A process according to claim 1, characterized in that the desorbed metal hydride forming particles suspended in the inert liquid are activated before their use in the absorber unit.

* * * * *

UNITED STATES PATENT AND TRADEMARK OFFICE
CERTIFICATE OF CORRECTION

PATENT NO. : 5,064,627

DATED : November 12, 1991

INVENTOR(S) : ZWART et al.

It is certified that error appears in the above-identified patent and that said Letters Patent is hereby corrected as shown below:

Column 1, lines 46-48, replace "(patent application which has been filed by the same applicants at the same date with the European Patent Office under the internal file number V 6078)" with --0355207--.

Column 2, lines 15-18, replace "(patent application which has been filed the same applicants at the same date with the European Patent Office under the internal file number V 6078)" with --0355207--.

UNITED STATES PATENT AND TRADEMARK OFFICE
CERTIFICATE OF CORRECTION

PATENT NO. : 5,064,627
DATED : November 12, 1991
INVENTOR(S) : Zwart et al.

It is certified that error appears in the above-indentified patent and that said Letters Patent is hereby corrected as shown below:

Column 3, lines 40-42, replace "(patent application which has been filed at the European Patent Office at the same date under the internal file number V 6078)" with --0355207--.

Signed and Sealed this

Third Day of August, 1993

Attest:

MICHAEL K. KIRK

*Attesting Officer*     Acting Commissioner of Patents and Trademarks